(12) United States Patent
Shetty et al.

(10) Patent No.: US 12,255,964 B1
(45) Date of Patent: Mar. 18, 2025

(54) SELECTION AND DEPLOYMENT OF SOLUTIONS IN DISTRIBUTED SYSTEMS

(71) Applicant: Dell Products L.P., Round Rock, TX (US)

(72) Inventors: Sudhir Vittal Shetty, Cedar Park, TX (US); Vinay Sawal, Fremont, CA (US); Christopher Bauer Atkinson, Woodstock, GA (US); Jason David Shaw, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/497,476

(22) Filed: Oct. 30, 2023

(51) Int. Cl.
*H04L 67/51* (2022.01)
*H04L 41/0806* (2022.01)
*H04L 41/12* (2022.01)
*H04L 41/22* (2022.01)

(52) U.S. Cl.
CPC .......... *H04L 67/51* (2022.05); *H04L 41/0806* (2013.01); *H04L 41/12* (2013.01); *H04L 41/22* (2013.01)

(58) Field of Classification Search
CPC ............... H04L 41/0823; H04L 41/083; H04L 41/0897; H04L 67/1008; H04L 67/1012; H04L 41/0806; H04L 41/12; H04L 41/0843; G06F 9/5083
See application file for complete search history.

(56) References Cited

U.S. PATENT DOCUMENTS

| | | | | |
|---|---|---|---|---|
| 6,240,463 B1* | 5/2001 | Benmohamed | ....... | H04L 41/145 709/239 |
| 8,046,206 B1* | 10/2011 | Hood, III | ................ | G06F 30/30 703/13 |
| 8,190,416 B2* | 5/2012 | Mead | ........................ | G06F 8/71 703/13 |
| 8,327,021 B2* | 12/2012 | Papoushado | ........ | H04L 41/0856 709/244 |
| 9,246,758 B2* | 1/2016 | Macauley | ........... | H04L 41/0806 |
| 9,692,651 B2* | 6/2017 | Mohan | .................... | H04L 41/12 |
| 9,813,301 B2* | 11/2017 | Xu | ........................ | H04L 41/083 |

(Continued)

OTHER PUBLICATIONS

S. Ghosh, P. De, K. Basu and S. K. Das, "PeterNet: an emergent technology based radio access network architecture for next generation cellular wireless systems," First International Conference on Broadband Networks, San Jose, CA, USA, 2004, pp. 641-650, doi: 10.1109/BROADNETS.2004.63. (Year: 2004).*

(Continued)

*Primary Examiner* — Alex H. Tran
(74) *Attorney, Agent, or Firm* — Womble Bond Dickinson (US) LLP (57) ABSTRACT

Methods and systems for managing operation of infrastructure are disclosed. The operation of the infrastructure may be managed by managed by identifying solutions that are compatible with the infrastructure. The solutions may be identified through graph analysis of the infrastructure and requirements of various solutions. One or more of the compatible solutions may be selected and used to identify actions and policies for the infrastructure. When used by the infrastructure, the actions and policies may update the operating state of the infrastructure so that the selected solutions may be provided.

20 Claims, 5 Drawing Sheets

(56) References Cited

U.S. PATENT DOCUMENTS

| | | | |
|---|---|---|---|
| 10,057,339 B2* | 8/2018 | Yeow | H04L 67/101 |
| 10,291,478 B1* | 5/2019 | Hosamani | H04L 41/12 |
| 10,769,335 B1* | 9/2020 | Sareen | G06F 30/30 |
| 10,785,107 B2* | 9/2020 | Mehdi | H04L 43/026 |
| 11,159,609 B2 | 10/2021 | McGrath et al. | |
| 11,200,246 B2 | 12/2021 | Kharisma et al. | |
| 11,232,381 B2* | 1/2022 | Marvin | G06N 5/02 |
| 11,374,979 B2* | 6/2022 | Mercian | H04L 63/20 |
| 11,652,872 B1 | 5/2023 | Parla et al. | |
| 11,711,270 B1* | 7/2023 | Pelekhaty | H04L 43/045 |
| | | | 709/220 |
| 2006/0004918 A1* | 1/2006 | Lubeck | H04L 67/1097 |
| | | | 709/221 |
| 2019/0140915 A1* | 5/2019 | Flavel | G06F 9/45558 |
| 2021/0392040 A1* | 12/2021 | Kerboeuf | H04L 41/044 |
| 2023/0101057 A1* | 3/2023 | Hafeez | H04L 45/04 |
| | | | 370/254 |
| 2023/0164029 A1* | 5/2023 | Mermoud | H04L 41/145 |
| | | | 709/220 |
| 2024/0007414 A1* | 1/2024 | Jain | G06F 9/505 |
| 2024/0023028 A1* | 1/2024 | Nikopour | G06N 3/045 |
| 2024/0048452 A1* | 2/2024 | Arutiunian | H04L 41/0806 |
| 2024/0048630 A1* | 2/2024 | Gilat | H04L 41/22 |

OTHER PUBLICATIONS

Ivanov A, Tonchev K, Poulkov V, Manolova A, Neshov NN. Graph-Based Resource Allocation for Integrated Space and Terrestrial Communications. Sensors (Basel). Aug. 2, 2022;22(15):5778. doi: 10.3390/s22155778. PMID: 35957333; PMCID: PMC9371046 (Year: 2022).*

McCreesh, Ciaran, et al. "When subgraph isomorphism is really hard, and why this matters for graph databases," Journal of Artificial Intelligence Research 61 (2018): 723-759 (37 Pages).

Kusari, Arpan, and Wenbo Sun. "Efficient Subgraph Isomorphism using Graph Topology," arXiv preprint arXiv:2209.09090 (2022) (20 Pages).

Ronaghan, Stacy, "Machine Learning: Trying to discover structure in your data," Medium, Jul. 31, 2018, Web Page <https://srnghn.medium.com/machine-learning-trying-to-discover-structure-in-your-data-2fbbc4f819ae> accessed on Jun. 22, 2023 (14 Pages).

Eliaçk, Eray, "Techniques to utilize data profiling for data quality evaluation," Big Data, Data Science, Data Science 101, Apr. 8, 2022, Web Page <https://dataconomy.com/2022/04/08/what-is-data-profiling/> accessed on Jun. 22, 2023 (11 Pages).

Jaimovitch-López, Gonzalo, et al. "Can language models automate data wrangling?" Machine Learning 112.6 (2023): 2053-2082 (30 Pages).

* cited by examiner

SELECTION AND DEPLOYMENT OF SOLUTIONS IN DISTRIBUTED SYSTEMS

FIELD

Embodiments disclosed herein relate generally to device management. More particularly, embodiments disclosed herein relate to systems and methods to onboard devices.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for providing services using endpoint devices. To provide services using endpoint devices, the endpoint devices may host various pieces of software, may be configured in certain manners, and/or may be adapted to provide the computer implemented services in various ways.

To identify the configurations, software, and/or other information for the endpoint devices, the endpoint devices and operable connectivity between them may be used to identify various solutions that are compatible with the infrastructure. The compatibility may be identified through a graph analysis process.

Once the compatible solutions are identified, one or more may be selected for implementation. The selected solutions may be used to identify actions and policies usable to update the endpoint devices. Actions/policies for other components of infrastructure may also be identified. The actions and policies may be used to update the operation of the infrastructure to provide the desired computer implemented services.

By doing so, infrastructure may be configured to provide desired computer implemented services corresponding to various solutions. By performing a graph analysis to identify solution compatibility for the infrastructure, the cognitive burden on administrator for identifying, selecting, and initiation implementation of solutions may be reduced.

Thus, embodiments disclosed herein may address, among others, the technical problem of security in a distributed system. By limiting how updates are distributed, the distributed system may be less susceptible to compromise and the overhead for securing the distributed system may be reduced (e.g., when compared to requiring all endpoint devices to equally participate in various security functions). Consequently, the distributed system may have increased computing resource availability for providing computer implemented services while reducing the likelihood of compromises occurring.

In an embodiment, a method for managing operation of a deployment is provided. The method may include identifying new infrastructure of the deployment; obtaining a graph representing components of the new infrastructure and operable connectivity between the components; performing a graph analysis process using the graph and graphs corresponding to solutions to identify at least one solution of the solutions; obtaining, based on the at least one solution, at least one action to be performed to onboard the new infrastructure and at least one policy for the new infrastructure; and using the at least one action and the at least one policy to place the new infrastructure in a desired operating state through onboarding; and providing computer implemented services using the new infrastructure in the desired operating state.

The graph may include vertices corresponding to the components and edges corresponding the operable connectivity between the components.

Each node may have an associated set of parameters based on characteristics of a corresponding component of the components.

The parameters may include a system characteristics parameter, a processing parameter, a memory parameter, and a storage parameter.

Each of the parameters may be multidimensional, and each dimension of the multiple dimensions of each of the parameters may be based on characteristics of some hardware of a respective component of the new infrastructure.

The graphs may correspond to the solutions each comprise a set of vertices corresponding to required components and a set of edges corresponding to required operable connectivity between the required components for a corresponding solution of the solutions to be provided.

Performing the graph analysis process may include filtering the graphs based on nodes of the graph to obtain a first subset of the graphs; filtering the first subset of the graphs based on edges of the graph to obtain a second subset of the graphs; and using the second subset of the graphs to identify the at least one solution.

Performing the graph analysis process may include performing an isomorphic subgraph analysis of the graph with respect to the graphs to identify a subset of the graphs; and identifying the at least one solution using the subset of the graphs.

Each of the graphs may be associated with a corresponding solution of solutions, and the at least one solution is identified using the associations between the graphs and the solutions.

Performing the isomorphic subgraph analysis may include for a first graph of the graphs: identifying a first node of the first graph that maps to a first node of the graph; and identifying a second node of the first graph that maps to a second node of the graph.

The at least one policy may define, at least in part, the desired operating state.

The new infrastructure may include an automation engine adapted to attempt to conform the operating state of the new infrastructure to the desired operating state.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may initiate performance the computer-implemented method when the computer instructions are executed by the processor.

Figure 1A:
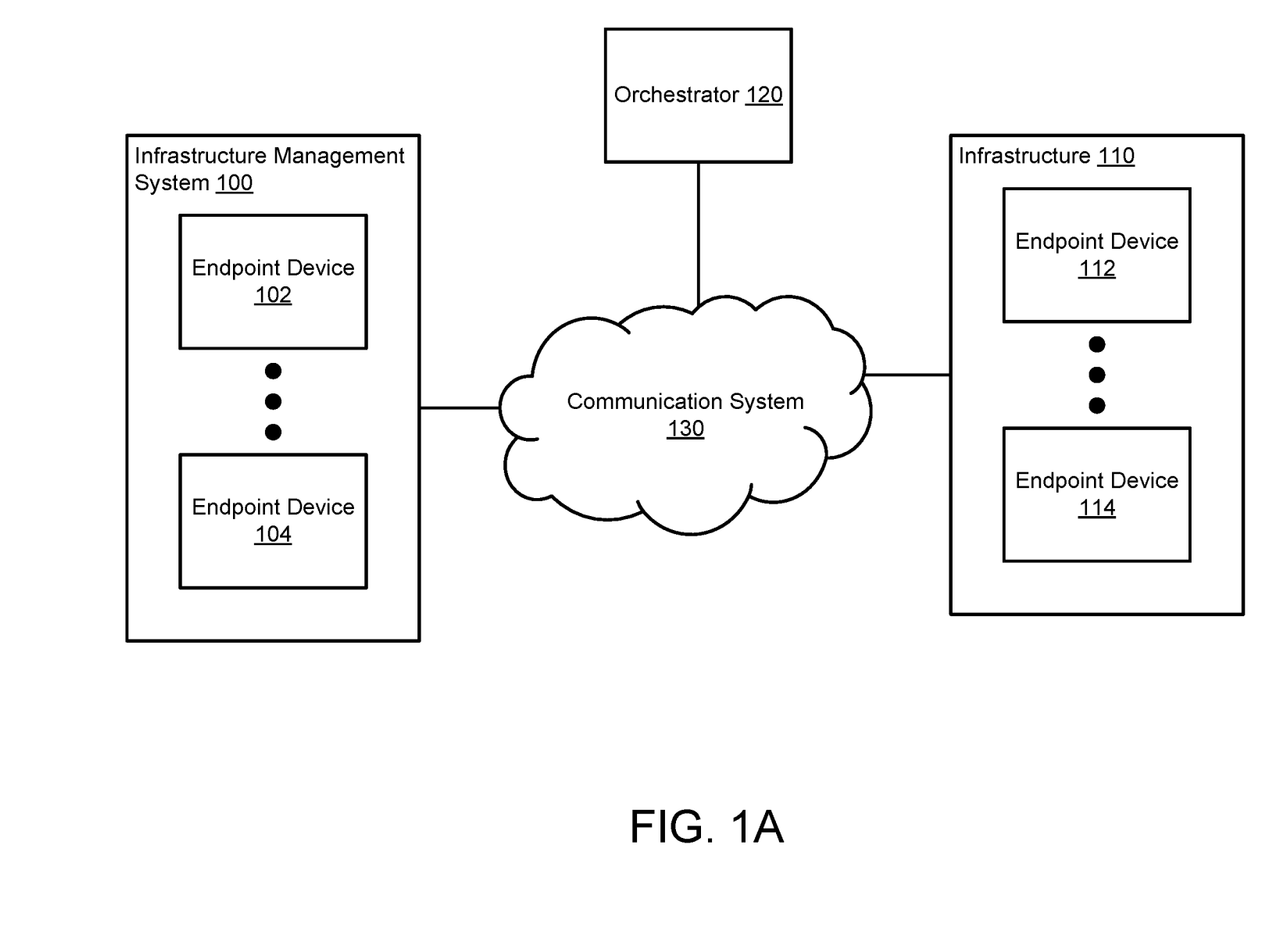
FIG. 1A shows a block diagram illustrating a system in accordance with an embodiment.

Turning to FIG. 1A, a block diagram illustrating a system in accordance with an embodiment is shown. The system shown in FIG. 1A may provide computer-implemented services. The computer implemented services may include any type and quantity of computer implemented services. For example, the computer implemented services may include data storage services, instant messaging services, database services, transaction processing services, and/or any other type of service that may be implemented with a computing device.

To provide the computer implemented services, the system may include infrastructure 110. Infrastructure 110 may include any number of endpoint devices (e.g., 112, 114), communications devices such as routers, storage systems, and/or other types of components. The endpoint devices may cooperatively and/or individually provide all, or a portion of the computer implemented services and may use any of the other components of infrastructure 110 to provide the computer implemented services.

To contribute to the computer implemented services, the endpoint devices may host certain software, may be configured in certain manners (e.g., network communication configurations, software/hardware configurations, etc.), and/or may otherwise be modified to meet one or more requirements to contribute to the computer implemented services (e.g., in aggregate "configuration requirements"). Further, groups of endpoint devices may be modified to cooperatively provide various services. For example, some endpoint devices of a group may host some software to provide some functions while other endpoint devices of a group may host different software to provide other functions which, in aggregate, allow desired computer implemented services to be provided. Operation of other components of infrastructure 110 may need to meet similar criteria to contribute to the computer implemented services.

The type of computer implemented services that may be provided by infrastructure 110 may be limited, for example, based on the number, type, and connectivity of the components (e.g., in aggregate "hardware requirements"). For example to provide computer implemented services in accordance with a desired solution (e.g., a storage solution, a processing solution, etc.), the components of infrastructure 110 may need to meet certain requirements.

If the hardware requirements for a solution are met, then infrastructure may be updated to also meet the configuration requirements. Once met, the computer implemented services corresponding to a selected solution may be provided.

However, when infrastructure 110 is initially deployed, the particular solution or solutions to be provided using infrastructure 110 may not be explicitly clear. For example, when infrastructure 110 is deployed, the type and content of infrastructure 110 may not exactly match the hardware requirements of any solution. If the solution(s) to be provided by infrastructure 110 are unclear (and/or if a selected solution includes hardware requirements not met by infrastructure 110), then a path to update operation of infrastructure 110 to meet configuration requirements for any solution may be unavailable. Consequently, infrastructure 110 may be left unconfigured and unable to provide any desired computer implemented services corresponding to various solutions.

In general, embodiments disclosed herein may provide methods, systems, and/or devices for managing the operation of infrastructure. To manage the infrastructure, a management framework for onboarding infrastructure may be used. The management framework may facilitate identification and deployment of solutions to be provided by various infrastructure.

To identify the solutions to be provided by infrastructure, the hardware characteristics of the infrastructure may be identified. The identified hardware characteristics may be used to generate a graph representing the hardware characteristics of the infrastructure.

Once the graph is obtained, an analysis process be performed to identify one or more solutions for the infrastructure. The analysis process may compare graphs of the hardware requirements of solutions to the graph of the hardware components of the infrastructure to some of the solutions that are compatible with the infrastructure.

Once identified, corresponding action and policies may be used to place the infrastructure into compliance with configuration requirements for one or more of the solutions deemed to be compatible with the infrastructure.

By doing so, embodiments disclosed herein may facilitate identification and implementation of solutions that are compatible with infrastructure in a manner that does not require exact matching of requirements between the infrastructure and requirements of the solutions, and/or direct correspondence between the infrastructure and the solutions.

To provide the above noted functionality, the system of FIG. 1A may include infrastructure management system 100, infrastructure 110, orchestrator 120, and communication system 130. Each of these components is discussed below.

Infrastructure management system 100 may facilitate modification of infrastructure 110. Infrastructure management system 100 may include any number of data processing systems (e.g., 102, 104). The data processing systems may be used by administrators and/or other persons that manage infrastructure 110 to provide desired computer implemented services.

The administrators may be tasked with establishing identifying, selecting, and initiating implementation of solutions for newly deployed infrastructure during onboarding of the new infrastructure. To do so, the administrators may be presented with information regarding solutions that are compatible with newly obtained infrastructure so that they administrators may select and initiate updating of the infrastructure to provide the selected solutions. An administrator may be a person or an automated system such as automation software that may select solutions based on a variety of factors (e.g., which may be provided, for example, as preferences from future users of the new infrastructure) using a selection algorithm that may optimize for the factors (e.g., using an objective function that quantifies a level of desirability of different solutions based on the variety of factors).

To obtain information regarding and initiating configuration of the new infrastructure, the administrators may use a portal or other interface provided by orchestrator 120. The portal may be used by the administrators to initiate modification of an endpoint device and/or other components of infrastructure. When doing so, the orchestrator may obtain information regarding new infrastructure that it may be tasked with managing, provide information regarding the infrastructure to the administrators via the portal, and receive input and/or other data indicating which solutions are selected for implementation.

Figure 2:
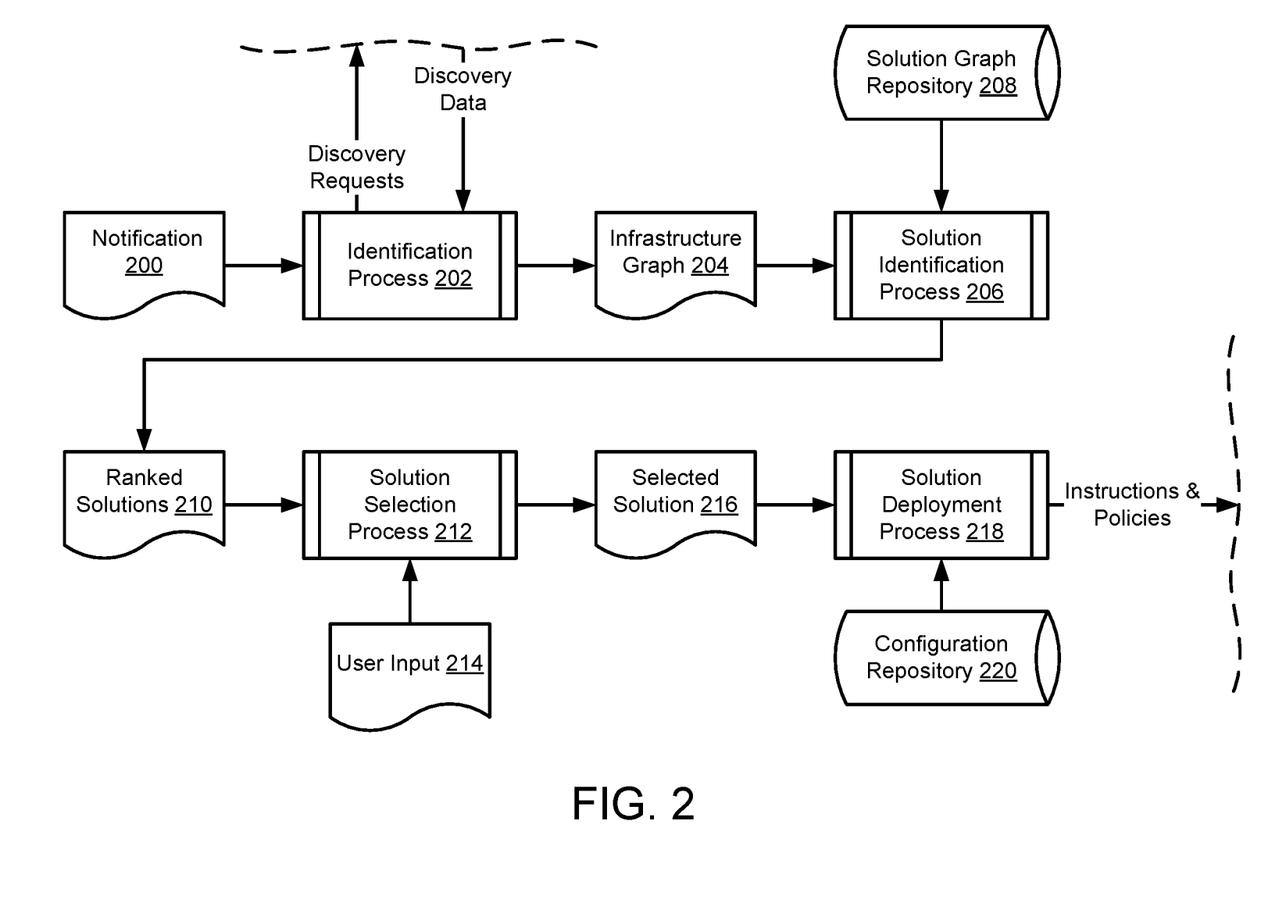
FIG. 2 show a data flow diagram illustrating data flows and data processing in accordance with an embodiment.

Orchestrator 120 may manage infrastructure 110. To manage infrastructure 110, orchestrator 120 may present interfaces to users of data processing systems 102-104 of infrastructure management system 100. The interfaces may allow privileged users (e.g., administrators, architects, etc.) to (i) obtain information regarding the infrastructure that may be being onboarded (e.g., when infrastructure is first obtained to be managed, configuring the infrastructure for desired operation), (ii) obtaining information regarding solutions to be implemented, and (iii) performing various actions and setting in place various policies to conform the operation of the new infrastructure to meet configuration requirements of a solution. Refer to FIG. 2 for additional details regarding management of infrastructure by orchestrator 120.

Infrastructure 110, as noted above, may provide computer implemented services. To provide the computer implemented services, the components of infrastructure 110 may (i) participate in the management framework by self-inventorying and providing information regarding their inventory to orchestrator 120, (ii) perform various actions as specified by orchestrator 120, and (iii) host automation software for deployment of software, change configurations, etc. to conform the operation of each component to that specified by various policies. For example, after orchestrator 120 identifies a solution to be provided by infrastructure 110, actions and/or policies may be distributed from orchestrator 120 to various components of infrastructure 110. When received, the automation software automatically cause the actions to be performed and the policies to be enforced (e.g., which may cause various configuration to be changed and other modifications to be made to the respective component).

The policies (e.g., one or more) deployed to a component may, in part, define a desired or goal state of operation. The automation software hosted by the component may attempt to conform the component to this goal state by, for example, (i) changing configuration settings for hardware/software components, (ii) install/uninstall software, (iii) suspend/resume execution of software, (iv) power/depower hardware components, and/or perform various other types of actions. The automation software may do so, for example, using a set of rules. The set of rules may define actions to be performed when deltas between the desired state and the actual state of a component of infrastructure 110 is identified.

Figure 3:
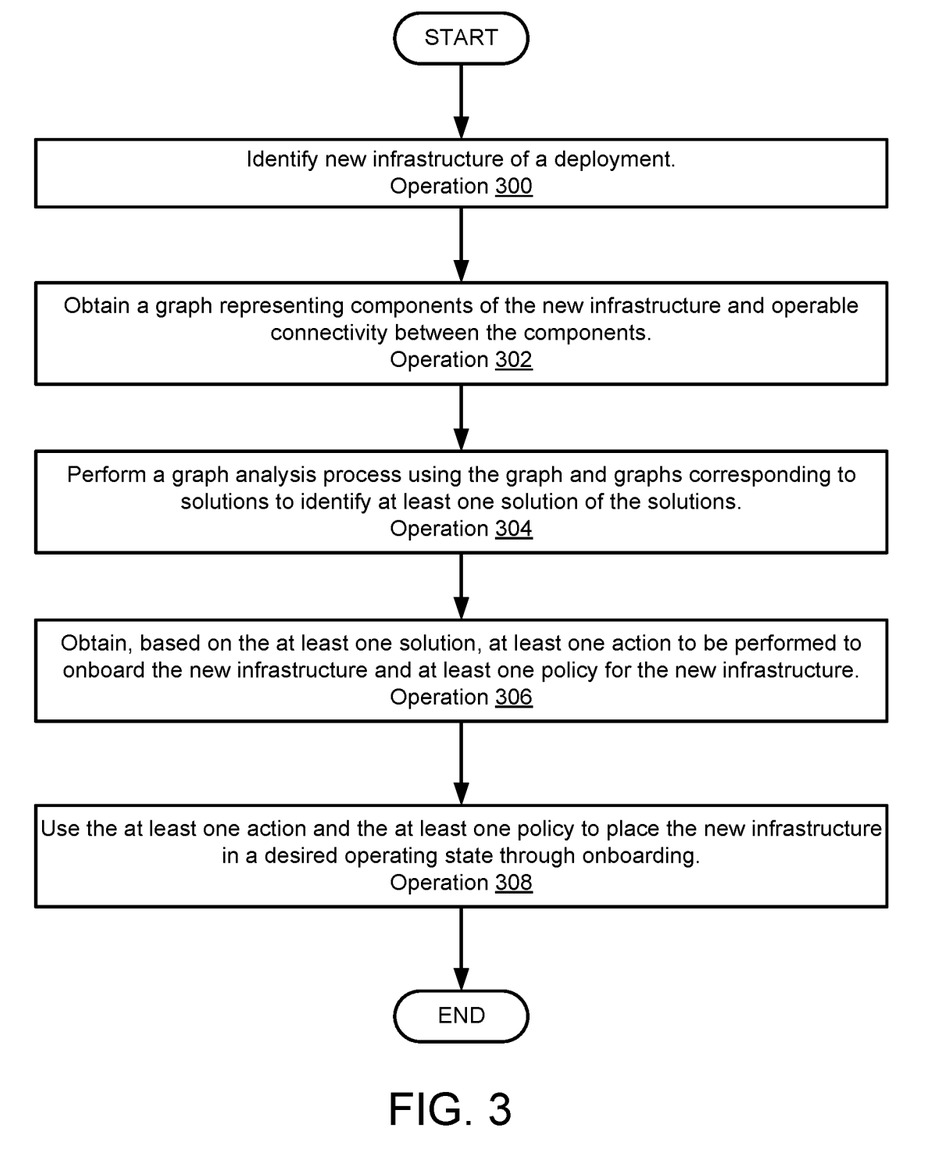
FIG. 3 shows a flow diagram illustrating a method in accordance with an embodiment.

When providing their functionality, any of (and/or components thereof) infrastructure management system 100, infrastructure 110, and/or orchestrator 120 may perform all, or a portion, of the actions and methods illustrated in FIGS. 2-3.

Any of (and/or components thereof) infrastructure management system 100, infrastructure 110, and orchestrator 120 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Any of the components illustrated in FIG. 1A may be operably connected to each other (and/or components not illustrated) with communication system 130. In an embodiment, communication system 130 includes one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1A as including a limited number of specific components, a system in accordance with an embodiment may include fewer, additional, and/or different components than those illustrated therein.

Figure 1B:
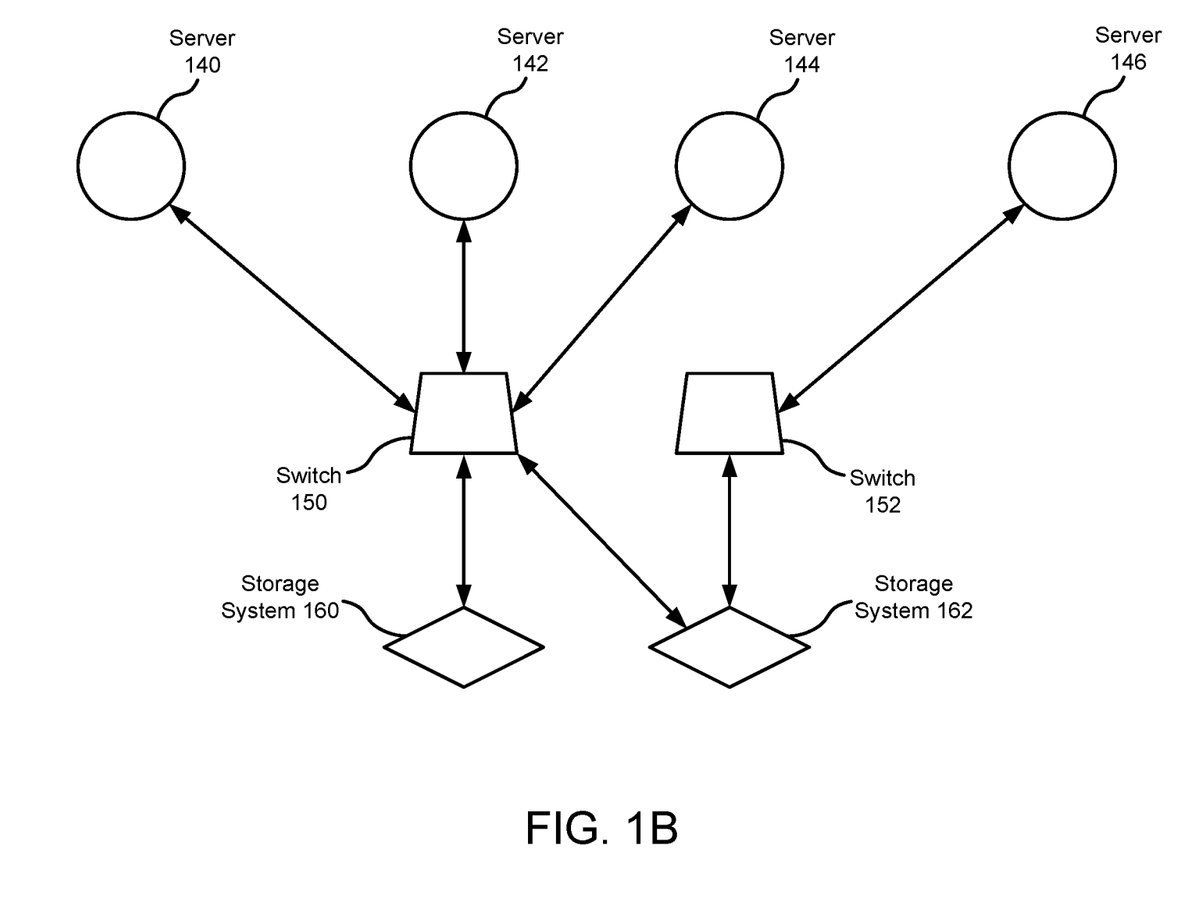
FIG. 1B shows a block diagram illustrating infrastructure in accordance with an embodiment.

As discussed above, when new component of infrastructure 110 are obtained, the new components may be onboarded so that the new components operate in accordance with various goals for the operation of infrastructure 110. Turning to FIG. 1B, a block diagram of an example a set of new components of infrastructure 110 in accordance with an embodiment is shown.

The new components may include, for example, servers 140-146, switches 150-152, and storage systems 160-162. In FIG. 1B, the servers are illustrated using a first type of shape (i.e., a circle), the switches are illustrated using a second type of shape (i.e., a trapezoid), and the storage systems are illustrated using a third type of shape (i.e., a diamond).

Operable connections (e.g., network communication links such as ethernet links or other types of links) between the components are illustrated using lines terminating in arrows at each end of each line. The number, type, and operable connectivity between the components shown in FIG. 1B is merely exemplary, and new components for an infrastructure may include different numbers, types, and connectivity without departing from embodiments disclosed herein.

The servers of the new components may provide desired computer services. When doing so, the servers may store data in and retrieve data from storage system 160 and may communicate with other servers.

The switches may provide, in part, the operable connectivity between the new components. For example, switches 150-152 may switch network data units (e.g., packets) as the network data units traverse the operable connections toward a destination device from an originating device.

The storage systems 160-162 may include network storages and/or other types of storages usable by the services to storage data for future use, to facilitate sharing of data among the servers, and/or for other data storage purposes.

When the new components are received at a particular location (e.g., a data center), the new components may be used to provide various desired solutions. However, because the number, type, and connectivity between the new components may be used to provide a variety of different solutions, it may not be clear while solutions are to be provided by the new infrastructure.

For example, a server may include various hardware components such as a processor (e.g., which may have various characteristics such as frequency of operation, number of cores, family membership, producer, etc.), a memory module (e.g., which may have various characteristics such as frequency of operation, quantity of memory, type of memory, family membership, producer, etc.), a storage device (e.g., which may have various characteristics such as quantity of storage, operations per second rating, type of media, storage throughout, family membership, producer, etc.), a host board (e.g., which may have various characteristics such as model, number of sockets for memory modules and population thereof, number of sockets for processors and population thereof, quantity of onboard memory, family membership, producer, etc.), communication devices (e.g., which may have various characteristics such as model, communication bandwidth, number of ports and population thereof, etc.) and/or other type of hardware components. Further, the server may be operably connected to other devices via various operable connections.

These hardware characteristics of the server (and/or hardware characteristics of a variety of other new components) may make the new components compatible with hardware requirements of a variety of different solutions. However, the compatibility may not be obvious (e.g., it may be difficult to identify alignment between the hardware characteristics of the new components and the hardware requirements of the solutions) and multiple competing compatibilities may be in place (e.g., the new components may be compatible with multiple solutions). Thus, it may be difficult to identify which solutions are to be provided using the new components.

To further clarify embodiments disclosed herein, a data flow diagram in accordance with an embodiment is shown in FIG. 2. In this diagram, flows of data and processing of data are illustrated using different sets of shapes. A first set of shapes (e.g., 200, 204, etc.) is used to represent data structures, and a second set of shapes (e.g., 202, 210, 214, etc.) is used to represent processes performed using and/or that generate data.

Turning to FIG. 2, a data flow diagram in accordance with an embodiment is shown. The data flow diagram may illustrate data used in and data processing performed in onboarding of infrastructure.

When new infrastructure reaches a location and begins operation, it may report itself to an orchestrator that may be manage it. Through this process, notification 200 may be obtained.

Notification 200 may indicate that new infrastructure is available for onboarding. Notification 200 may indicate the components and identifiers for the components to be onboarded.

To onboard the new infrastructure, identification process 202 may be performed. During identification process 202, information regarding the new infrastructure may be obtained. For example, various discovery requests may be sent to the new infrastructure and corresponding discovery data may be provided back. The discovery data may include the hardware characteristics of the new infrastructure. Refer to FIG. 1B for additional details regarding the hardware characteristics of infrastructure.

Once the discovery data is obtained, infrastructure graph 204 may be generated. Infrastructure graph 204 may include nodes representing components of the new infrastructure and edges between the nodes representing the operable connectivity between the components.

The nodes may be treated, for example, as vertices. Each of the vertices may include a set of parameters corresponding to the hardware characteristic of the component of the new infrastructure associated with the node. For example, the parameters may include processing parameters (e.g., reflecting the characteristics of the hardware processors), memory parameters (e.g., reflecting the characteristics of the memory modules of a component), storage parameters (e.g., reflecting the characteristics of the storage devices), system parameters (e.g., reflecting the characteristics of the boards interconnecting the other hardware devices of the component), and/or other types of parameters for the component. Each edge between vertices may include similar parameters but for the connectivity (e.g., may indicate type of link, bandwidth of the link, latency of the link, ports used to provide the link, etc.). Thus, the parameters of the vertices and/or edges may be multidimensional with different dimension corresponding to different characteristics of the hardware of a component.

Accordingly, infrastructure graph 204 may include a set of vertices with various vertices interconnected a set of edges.

Once infrastructure graph 204 is obtained, solution identification process 206 may be performed. During solution identification process 206, a filtering process for graphs corresponding to various solutions from solution graph repository 208 may be performed. The filtering process may be a multistage filtering process to identify a candidate set of graphs corresponding to a subset of the solutions.

For example, solution graph repository 208 may include any number of graphs associated with corresponding solutions. The graphs may be similar to infrastructure graph 204, but may be based on hardware requirements for the associated solution rather than the new infrastructure for onboarding.

During the filtering process, the graphs may be filtered based on nodes of infrastructure graph 204 to identify a first subset of the graphs. The first subset of the graphs may be filtered based on the edges of infrastructure graph 204 to obtain a second subset of the graphs. The second subset of the graphs may be the candidate set of graphs that each have numbers of nodes and edges that fall within the numbers of nodes and edges of infrastructure graph 204.

Once the candidate set of graphs is identified, an isomorphic subgraph analysis may be performed for each graph of the candidate set of graphs with respect to infrastructure graph 204. During the isomorphic subgraph analysis, each graph of the candidate set of graphs may attempt to be matched (e.g., having nodes and corresponding edges that generally match those of infrastructure graph 204 with some variance within a prescribed limit) to a portion of infrastructure graph 204. Those that are able to be matched may be added to a final subset of the graphs that are considered to be compatible with the new infrastructure.

When doing the comparison between the graphs from the candidate set of graphs and infrastructure graph 204, similarity between nodes and edges may be calculated using any similarity algorithm to quantify the level of similarity.

Thresholds levels of similarity may be used to identify whether the quantification for a node/edge indicates that the node/edge from a candidate graph matches a node/edge of infrastructure graph.

Any type of isomorphic subgraph algorithm may be used to identify whether a candidate solution graph matches a portion of infrastructure graph 204.

Once obtained, the final subset of the graphs that are considered to be compatible with the new infrastructure may be used to establish ranked solutions 210. Ranked solutions 210 may include the solutions corresponding to the final subset of the graphs. For example, ranked solutions 210 may be an ordered list of solutions corresponding to graphs of the final subset of the graphs. The ranking of the solutions may be based on the overall similarity level quantification (e.g., may be an average of the similarity level of each matched node and matched edge, or may be weighted average or other formula based quantification to ascribe different weights to different characteristics of each graph for ranking purposes, weights may be set by an administrator, an automated process, a subject matter expert, etc.) of each graph with respect to infrastructure graph 204.

Once ranked solutions 210 are obtained, solution selection process 212 may be performed. During solution selection process 212, information regarding ranked solutions 210 may be provided to an administrator (e.g., person or automated entity). The administrator may use various criteria and/or preferences to select one or more solutions of ranked solutions for implementation.

For example, user input 214 from an administrator may be obtained which may indicate the solutions to be provided by the new infrastructure and through which selected solution 216 may be obtained. Selected solution 216 may indicate the one or more solutions to be provided using the new infrastructure. For example, selected solutions 216 may include a label or other information usable to identify the one or more solutions. The label for the solution(s) may be stored with and/or otherwise associated with the new infrastructure.

After selected solution 216 is obtained, solution deployment process 218 may be performed. During solution deployment process 218, various actions and policies for the new infrastructure may be selected and deployed.

To select the actions and policies, a lookup in configuration repository 220 may be performed. Configuration repository 220 may store various actions and policies. The actions and policies may be associated with different solutions. Thus, the label for the selected solution 216 may be used as a key to perform the lookup. The lookup may return any number of actions and policies.

The actions may be packaged as instructions and sent to automation frameworks of corresponding components of the new infrastructure. Similarly, the policies may be packaged and sent to the corresponding components of the new infrastructure.

For example, the actions and policies may be associated with nodes of the graph of the selected solution. The instructions and policies may be sent to the components of the new infrastructure corresponding to the nodes of infrastructure graph 204 that matched the nodes of the graph of the selected solution.

Once obtained by the components, the automation software hosted by the component of new infrastructure may perform the actions and begin enforcement of the policies. The actions and policies enforced by the components of the new infrastructure may cause, for example, the configuration of each component to be updated to match the configuration requirements of the solution (and/or to the extent that they can match, may be impossible to completely match in some cases).

The actions may include various initial actions to be performed along with policy enforcement. For example, the actions may include upgrading/installing various software, performing testing on the component to confirm operable condition, etc.

Thus, the combination of actions and policy enforcement may be likely to place the new infrastructure in condition to provide computer implemented services expected for selected solution 216.

Any of the processes illustrated using the second set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor based devices (e.g., computer chips).

Any of the data structures illustrated using the first and third set of shapes may be implemented using any type and number of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

As discussed above, the components of FIG. 1A may perform various methods to manage operation of endpoint devices through application of updates. FIG. 3 illustrates a method that may be performed by the components of the system of FIG. 1A. In the diagram discussed below and shown in FIG. 3, any of the operations may be repeated, performed in different orders, and/or performed in parallel with or in a partially overlapping in time manner with other operations.

Turning to FIG. 3, a flow diagram illustrating a method for managing onboarding of infrastructure in accordance with an embodiment is shown. The method may be performed by any of (and/or components thereof) infrastructure management system 100, infrastructure 110, orchestrator 120, and/or other components of the system shown in FIG. 1A.

Prior to operation 300, new infrastructure may be purchased or otherwise acquired, moved to a location, and powered to join a deployment.

At operation 300, new infrastructure for the deployment is identified. The new infrastructure may be identified by obtaining a notification indicating that the new infrastructure is available for onboarding. The notification may be obtained by reading it from storage, receiving it from another device, by generating it (e.g., based on sensing of the presence of the new infrastructure, and/or via other methods.

At operation 302, a graph representing components of the new infrastructure and operable connectivity between the components of the new infrastructure is obtained. The graph may be obtained by reading it from storage, receiving it from another device, by generating it, and/or via other methods.

The graph may be generated by (i) obtaining hardware characteristics for the new infrastructure, and (ii) populating the graph based on the hardware characteristics. The populated graph may include nodes (e.g., vertices) representing the components of the new infrastructure and edges representing the connectivity between the components.

At operation 304, a graph analysis process is performed using the graphs and graphs corresponding to solutions to identify at least one solution of the solutions. The graph analysis may be performed by (i) filtering the graphs based on nodes of the graph and the graphs to obtain a first subset of the graphs, and (ii) filtering the first subset of the graphs based on edges between the nodes of the graphs and the edges between nodes of the graphs to obtain a candidate subset of the graphs.

The candidate subset of the graphs may be used to perform an isomorphic subgraph analysis of the graphs of the candidate subset of the graphs with respect to the graph to identify a final subset of the graphs that indicate solutions that are compatible with the new infrastructure. For example, any for the candidate subset of the graphs that match a sub-portion of the graph may be added to the final subset of the graphs.

At operation 306, at least one action to be performed to onboard the new infrastructure and at least one policy for the new infrastructure is obtained based on the at least one solution. The at least one action and the at least one policy may be obtained by (i) selecting one or more of the at least one solutions for implementation, and (ii) performing a lookup based on the selected one or more of the at least one solutions in a repository that associates actions/policies with different solutions.

At operation 308, the at least one action and the at least one policy are used to place the new infrastructure in a desired operating state through onboard. The new infrastructure may be placed in the desired operating state through onboarding by providing the at least one action and the at least one policy to automation software on various components of the new infrastructure to cause the at least one action to be performed and the at least one policy to be enforced (e.g., which may cause any number of enforcement actions to be performed).

The combination of the at least one action and the policy enforcement may update the operation of the new infrastructure to be in the desired operating state.

The method may end following operation 308.

Following operation 308, desired computer implemented services may be provided by the operation of the new infrastructure while in the desired operating state. Additionally, the policy enforcement may cause the new infrastructure to stay in the desired operating state through, for example drift management via policy enforcement. Thus, the new infrastructure may be likely to stay in the desired operating state.

Thus, using the method shown in FIG. 3, embodiments disclosed herein may facilitate providing of desired solution using infrastructure that does not exactly match requirements of various solutions that may be provided. The disclosed methods may reduce a cognitive burden on an administrator by automatically identifying solutions that may be provided by the new infrastructure. Accordingly, the administrator may not need to analyze the infrastructure to identify the compatible solutions.

Figure 4:
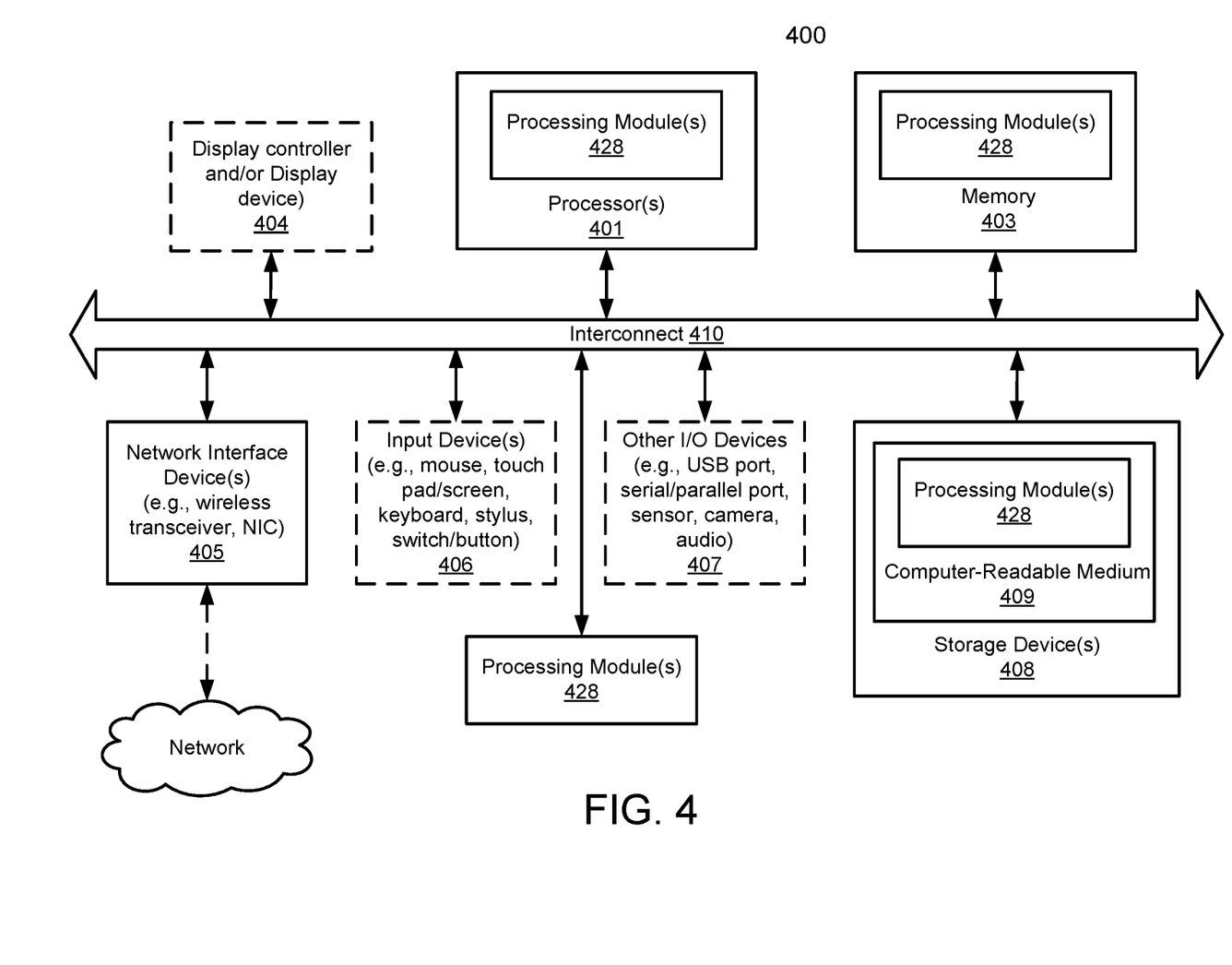
FIG. 4 shows a block diagram illustrating a data processing system in accordance with an embodiment.

Any of the components illustrated in FIGS. 1A-2 may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium. Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are accordingly, to be regarded in an illustrative sense rather than a restrictive sense.

What is claimed is:

1. A method for managing operation of a deployment, the method comprising:
   identifying new infrastructure of the deployment;
   obtaining a new infrastructure graph representing components of the new infrastructure and operable connectivity between the components;
   performing a graph analysis process using the new infrastructure graph and solution graphs corresponding to existing solutions to obtain a subset of the solution graphs from a solution graph repository, the subset comprising at least two of the solution graphs;
   identifying, based at least on the graph analysis process, at least one solution of the existing solutions by at least ranking each of the at least two of the solution graphs to obtain a ranked solutions list comprising the at least two of the solution graphs and a ranking for each of the at least two of the solution graphs;
   obtaining, based on the at least one solution, at least one action to be performed to onboard the new infrastructure and at least one policy for the new infrastructure; and
   using the at least one action and the at least one policy to place the new infrastructure in a desired operating state through onboarding; and
   providing computer implemented services using the new infrastructure in the desired operating state.

2. The method of claim 1, wherein the new infrastructure graph comprises nodes corresponding to the components and edges corresponding to the operable connectivity between the components.

3. The method of claim 2, wherein each of the nodes has an associated set of parameters based on characteristics of a corresponding component of the components.

4. The method of claim 3, wherein the parameters comprise a system characteristics parameter, a processing parameter, a memory parameter, and a storage parameter.

5. The method of claim 4, wherein each of the parameters is multidimensional, and each dimension of the multiple dimensions of each of the parameters being based on characteristics of some hardware of a respective component of the new infrastructure.

6. The method of claim 2, wherein each of the solution graphs comprises a set of nodes corresponding to required components and a set of edges corresponding to required operable connectivity between the required components for a corresponding solution of the existing solutions to be provided.

7. The method of claim 1, wherein performing the graph analysis process comprises:
   filtering the solution graphs based on nodes of the new infrastructure graph to obtain a first subset of the solution graphs; and
   filtering the first subset of the solution graphs based on edges of the new infrastructure graph to obtain a second subset of the solution graphs,
   wherein the second subset of the solution graphs is used in the identifying of the at least one solution.

8. The method of claim 1, performing the graph analysis process comprises:
   performing an isomorphic subgraph analysis of the new infrastructure graph with respect to the solution graphs to identify a subset of the solution graphs,
   wherein the subset of the solution graphs is used in the identifying of the at least one solution.

9. The method of claim 8, wherein each of the solution graphs is associated with a corresponding solution of existing solutions, and the at least one solution is identified using the associations between the solution graphs and the existing solutions.

10. The method of claim 8, wherein performing the isomorphic subgraph analysis comprises:
for a first solution graph of the solution graphs:
identifying a first node of the first solution graph that maps to a first node of the new infrastructure graph; and
identifying a second node of the first solution graph that maps to a second node of the new infrastructure graph.

11. The method of claim 1, wherein the at least one policy defines, at least in part, the desired operating state.

12. The method of claim 11, wherein the new infrastructure comprises an automation engine adapted to attempt to conform the operating state of the new infrastructure to the desired operating state.

13. The method of claim 1, wherein
identifying the at least one solution further comprises:
presenting the ranked solutions list to a user managing the new infrastructure; and
obtaining a selection from the user, the selection comprising at least one of the two or more of the solution graphs and the selection being identified as the at least one solution.

14. The method of claim 1, wherein the at least one action and the at least one policy are obtained from a configuration repository that stores actions and policies in association with ones of the existing solutions, the configuration repository being different from the solution graph repository and the at least one action being an action to be performed by an automation framework of at least one of the components of the new infrastructure.

15. A non-transitory machine-readable medium having instructions stored therein, which when executed by a processor, cause the processor to perform operations for managing operation of a deployment, the operations comprising:
identifying new infrastructure of the deployment;
obtaining a new infrastructure graph representing components of the new infrastructure and operable connectivity between the components;
performing a graph analysis process using the new infrastructure graph and solution graphs corresponding to existing solutions to obtain a subset of the solution graphs from a solution graph repository, the subset comprising at least two of the solution graphs;
identifying, based at least on the graph analysis process, at least one solution of the existing solutions by at least ranking each of the at least two of the solution graphs to obtain a ranked solutions list comprising the at least two of the solution graphs and a ranking for each of the at least two of the solution graphs;
obtaining, based on the at least one solution, at least one action to be performed to onboard the new infrastructure and at least one policy for the new infrastructure; and
using the at least one action and the at least one policy to place the new infrastructure in a desired operating state through onboarding; and
providing computer implemented services using the new infrastructure in the desired operating state.

16. The non-transitory machine-readable medium of claim 15, wherein the new infrastructure graph comprises nodes corresponding to the components and edges corresponding to the operable connectivity between the components.

17. The non-transitory machine-readable medium of claim 16, wherein each of the nodes has an associated set of parameters based on characteristics of a corresponding component of the components.

18. The non-transitory machine-readable medium of claim 17, wherein the parameters comprise a system characteristics parameter, a processing parameter, a memory parameter, and a storage parameter.

19. A management system, comprising:
a processor; and
a memory coupled to the processor to store instructions, which when executed by the processor, cause the processor to perform operations for managing operation of a deployment, the operations comprising:
identifying new infrastructure of the deployment;
obtaining a new infrastructure graph representing components of the new infrastructure and operable connectivity between the components;
performing a graph analysis process using the new infrastructure graph and solution graphs corresponding to existing solutions to obtain a subset of the solution graphs from a solution graph repository, the subset comprising at least two of the solution graphs;
identifying, based at least on the graph analysis process, at least one solution of the existing solutions by at least ranking each of the at least two of the solution graphs to obtain a ranked solutions list comprising the at least two of the solution graphs and a ranking for each of the at least two of the solution graphs;
obtaining, based on the at least one solution, at least one action to be performed to onboard the new infrastructure and at least one policy for the new infrastructure; and
using the at least one action and the at least one policy to place the new infrastructure in a desired operating state through onboarding; and
providing computer implemented services using the new infrastructure in the desired operating state.

20. The management system of claim 19, wherein the new infrastructure graph comprises nodes corresponding to the components and edges corresponding to the operable connectivity between the components.

* * * * *